(12) United States Patent
Wang et al.

(10) Patent No.: US 11,733,530 B1
(45) Date of Patent: Aug. 22, 2023

(54) HEAD-MOUNTABLE DEVICE HAVING LIGHT SEAL ELEMENT WITH ADJUSTABLE OPACITY

(71) Applicant: Apple Inc., Cupertino, CA (US)

(72) Inventors: Paul X. Wang, Cupertino, CA (US); Yoonhoo Jo, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 17/384,612

(22) Filed: Jul. 23, 2021

Related U.S. Application Data

(60) Provisional application No. 63/082,991, filed on Sep. 24, 2020.

(51) Int. Cl.
*G02B 27/01* (2006.01)

(52) U.S. Cl.
CPC ..... *G02B 27/0176* (2013.01); *G02B 27/0172* (2013.01); *G02B 2027/0138* (2013.01); *G02B 2027/0154* (2013.01)

(58) Field of Classification Search
CPC ............ G02B 27/0176; G02B 27/0172; G02B 2027/0138; G02B 2027/0154
See application file for complete search history.

(56) References Cited

U.S. PATENT DOCUMENTS

| | | | |
|---|---|---|---|
| 8,970,452 B2 | 3/2015 | Wheeler et al. | |
| 9,147,111 B2 | 9/2015 | Fleck et al. | |
| 10,371,944 B2 | 8/2019 | Mallinson | |
| 2018/0052327 A1* | 2/2018 | Kamakura | G02B 27/0103 |
| 2021/0245041 A1 | 8/2021 | Mikhailov et al. | |
| 2021/0302750 A1* | 9/2021 | Law | G06F 3/011 |
| 2022/0050293 A1* | 2/2022 | Ishioka | H04N 5/64 |

* cited by examiner

*Primary Examiner* — Sahlu Okebato
(74) *Attorney, Agent, or Firm* — Bakerhostetler

(57) ABSTRACT

A head-mountable device can include a light seal element with adjustable opacity. In various configurations of the light seal element, the opacity there through can be adjusted to control an amount of light and/or airflow from an external environment. For example a cover or combination of overlapping covers can be adjusted to selectively exclude light from an external environment or provide a direct view to the external environment. Transitions can be achieved while the head-mountable device is worn by a user.

19 Claims, 7 Drawing Sheets

HEAD-MOUNTABLE DEVICE HAVING LIGHT SEAL ELEMENT WITH ADJUSTABLE OPACITY

CROSS-REFERENCE TO RELATED APPLICATION

This application claims the benefit of U.S. Provisional Application No. 63/082,991, entitled "HEAD-MOUNTABLE DEVICE HAVING LIGHT SEAL ELEMENT WITH ADJUSTABLE OPACITY," filed Sep. 24, 2020, the entirety of which is incorporated herein by reference.

TECHNICAL FIELD

The present description relates generally to head-mountable devices, and, more particularly, to light seal elements of head-mountable devices having adjustable opacity.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

It can be desirable to provide a head-mountable device with various configurations that can alternately be achieved to provide different user experiences and/or to manage conditions for the user during use. For example, a user can be provided with either an immersive experience that focuses on the visual content output by the head-mountable device or a partially open experience that includes a view of an external environment. Such a view can be provided without requiring removal of the head-mountable device.

Embodiments of the present disclosure provide a head-mountable device that includes a light seal element with adjustable opacity. In various configurations of the light seal element, the opacity there through can be adjusted to control an amount of light and/or airflow from an external environment. For example a cover or combination of overlapping covers can be adjusted to selectively exclude light from an external environment or provide a direct view to the external environment. Transitions can be achieved while the head-mountable device is worn by a user.

These and other embodiments are discussed below with reference to FIGS. 1-12. However, those skilled in the art will readily appreciate that the detailed description given herein with respect to these Figures is for explanatory purposes only and should not be construed as limiting.

Figure 1:
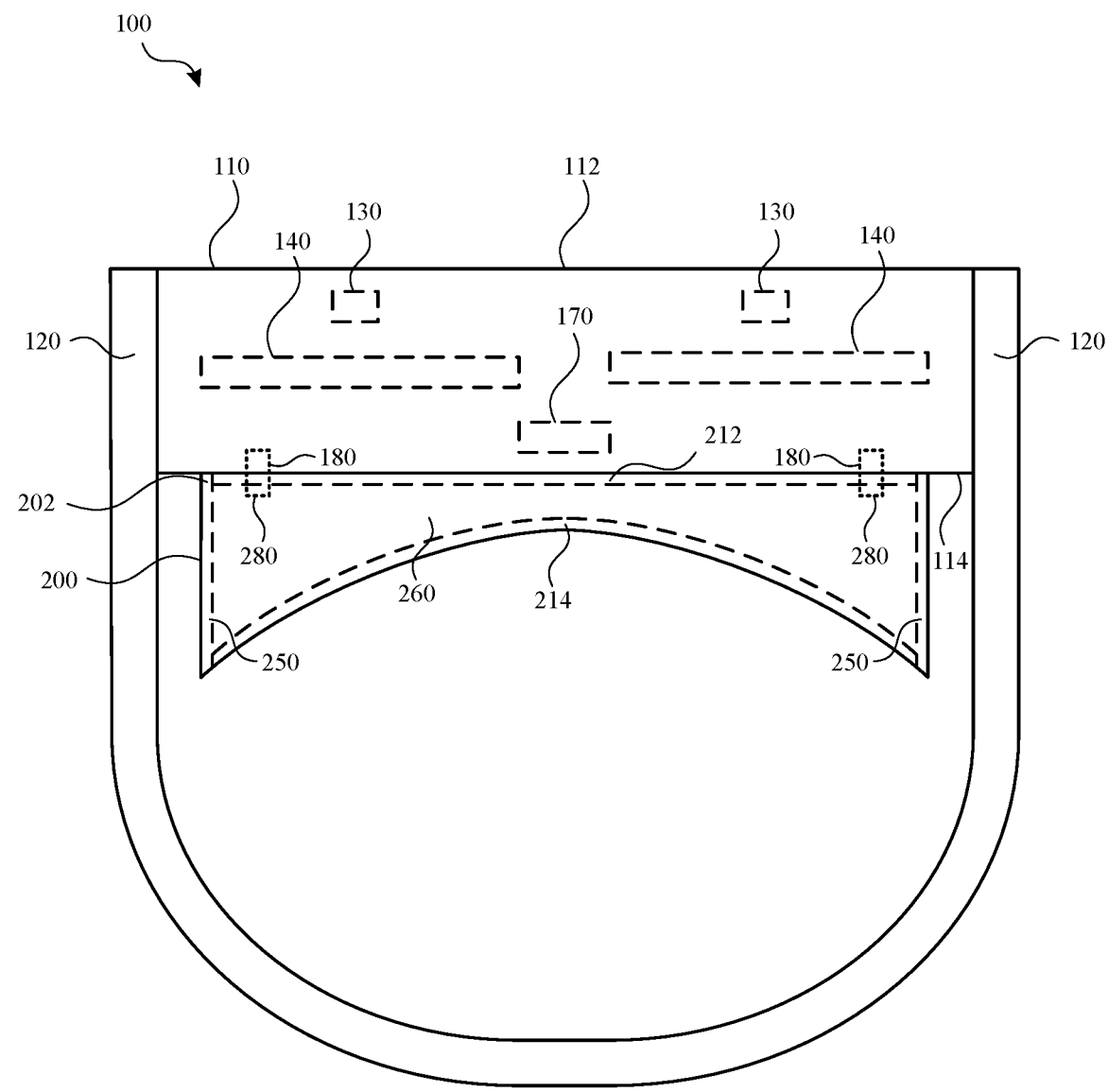
FIG. 1 illustrates a top view of a head-mountable device with a light seal element, according to some embodiments of the present disclosure.

According to some embodiments, for example as shown in FIG. 1, a head-mountable device 100 includes a frame 110 and a light seal element 200 that are worn on a head of a user. The frame 110 can be positioned in front of the eyes of a user to provide information within a field of view of the user. The frame 110 and/or the light seal element 200 can provide a nosepiece to rest on a user's nose.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can be positioned within the light seal element 200 and/or a head securement element 120 of the head-mountable device 100.

The frame 110 can include and/or support one or more cameras 130. The cameras 130 can be positioned on or near an outer side 112 of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the cameras 130 can be movable along the outer side 112. For example, a track or other guide can be provided for facilitating movement of the camera 130 therein.

The head-mountable device 100 can include display elements 140 that provide visual output for viewing by a user wearing the head-mountable device 100. One or more display elements 140 can be positioned on or near an inner side 114 of the frame 110. As used herein, an inner side 114 of a portion of a head-mountable device is a side that faces toward the user and/or away from the external environment.

A display element 140 can transmit light from a physical environment (e.g., as captured by a camera) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance ("IPD") of the user. IPD is defined as the distance between the centers of the pupils of a user's eyes.

As further shown in FIG. 1, attachment elements can facilitate coupling of the frame 110 to the light seal element 200 in a relative position and orientation that aligns the display elements 140 of the frame 110 in a preferred position and orientation for viewing by the user. The frame 110 and the light seal element 200 can be coupled to prevent ingress of light from an external environment. For example, frame attachment elements 180 can releasably engage light seal attachment elements 280. One or more of various mechanisms can be provided to secure the modules to each other. For example, mechanisms such as locks, latches, snaps, screws, clasps, threads, magnets, pins, an interference (e.g., friction) fit, knurl presses, bayoneting, and/or combinations thereof can be included to couple and/or secure the frame 110 and the light seal element 200 together. The modules can remain secured to each other until an optional release mechanism is actuated. The release mechanism can be provided on an outer surface of the head-mountable device 100 for access by a user.

While the light seal element 200 is shown schematically with a particular size and shape, it will be understood that the size and shape of the light seal element 200, particularly at the inner side 214 of the light seal element 200, can have a size and shape that accommodates the face of a user wearing the head-mountable device 100. For example, the inner side 214 can provide a shape that generally matches the contours of the user's face around the eyes of the user. The inner side 214 can be provided with one or more features that allow the light seal element 200 to conform to the face of the user to enhance comfort and block light from entering the light seal element 200 at the point of contact with the face. For example, the inner side 214, or portions thereof, can provide a flexible, soft, elastic, and/or compliant structure, as described further herein.

The frame 110 and/or the light seal element 200 can be supported on a user's head with a head securement element 120. The head securement element 120 can wrap or extend along opposing sides of a user's head and/or to a rear of the user's head. The head securement element 120 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated head securement element 120 of the head-mountable device 100. The head securement element 120 can optionally include a band for extending to and/or about a rear side of the head of the user. The head securement element 120 can optionally extend from the frame 110 or another component coupled to the frame 110. For example, the head securement element 120 can optionally extend from the light seal element 200. The band can be stretchable to comfortably provide tension about the head of the user. The head securement element can further include an adjustment element (not shown) for adjusting a tightness and/or fit of the head securement element.

As further shown in FIG. 1, the light seal element 200 can include a chassis 202 that provides structural support to one or more other components of the light seal element 200. The chassis 202 can include an inner side 214 and an outer side 212 that is connected to the inner side 214. The inner side 214, the outer side 212, and/or other components of the chassis 202 can support an inner cover 250 and/or an outer cover 260 that extend at least partially from the outer side 212 to the inner side 214 and about at least a portion of a perimeter of the light seal element 200. It will be understood that the inner cover 250 and/or an outer cover 260 can be provided or stowed to provide a desired amount of light and/or exposure to an external environment, as described further herein.

As further shown in FIG. 1, attachment elements can facilitate coupling of the frame 110 to the light seal element 200 in a relative position and orientation that aligns the display elements 140 of the frame 110 in a preferred position and orientation for viewing by the user. The frame 110 and the light seal element 200 can be coupled to prevent ingress of light from an external environment. For example, frame attachment elements 180 can releasably engage light seal attachment elements 280. One or more of various mechanisms can be provided to secure the modules to each other. For example, mechanisms such as locks, latches, snaps, screws, clasps, threads, magnets, pins, an interference (e.g., friction) fit, knurl presses, bayoneting, and/or combinations thereof can be included to couple and/or secure the frame 110 and the light seal element 200 together. The modules can remain secured to each other until an optional release mechanism is actuated. The release mechanism can be provided on an outer surface of the head-mountable device 100 for access by a user.

While the light seal element 200 is shown schematically with a particular size and shape, it will be understood that the size and shape of the light seal element 200, particularly at the inner side 214 of the light seal element 200, can have a size and shape that accommodates the face of a user wearing the head-mountable device 100. For example, the inner side 214 can provide a shape that generally matches the contours of the user's face around the eyes of the user. The inner side 214 can be provided with one or more features that allow the light seal element 200 to conform to the face of the user to enhance comfort and block light from entering the light seal element 200 at the point of contact with the face. For example, the inner side 214 can provide a flexible, soft, elastic, and/or compliant structure.

Figure 2:
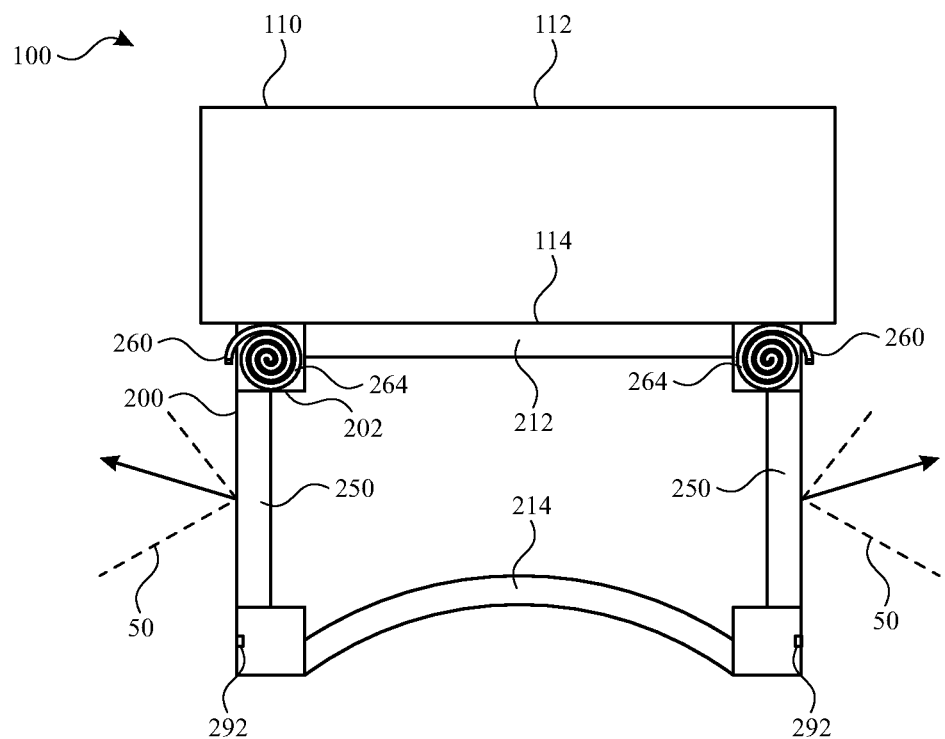
FIG. 2 illustrates a top view of a head-mountable device with a cover of a light seal element in a retracted configuration, according to some embodiments of the present disclosure.
Figure 3:
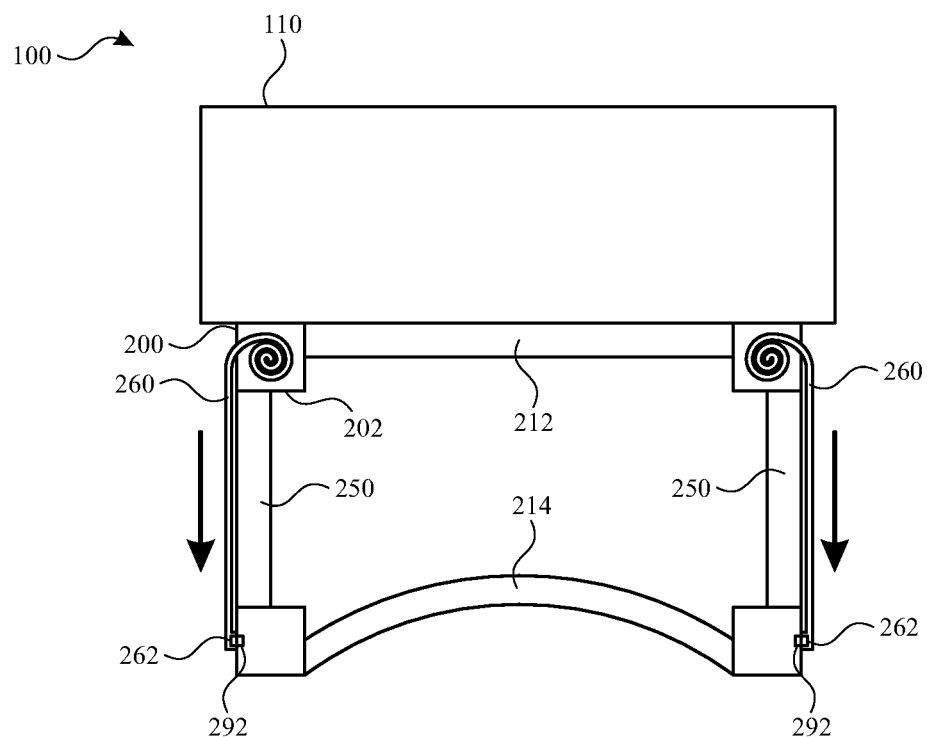
FIG. 3 illustrates a top view of the head-mountable device of FIG. 2 with the cover in an extended configuration, according to some embodiments of the present disclosure.

Referring now to FIGS. 2 and 3, one or more covers of a light seal element can provide variable opacity as at least one of the covers transitions between retracted and extended configurations. For example, a cover can be adjusted to extend between inner and outer sides of the light seal element.

FIG. 2 illustrates a top view of a head-mountable device 100 with an outer cover 260 of a light seal element 200 in a retracted configuration, according to some embodiments of the present disclosure. As shown in FIG. 2, an outer cover 260 can be stored in a retracted configuration. While in the retracted configuration, at least a portion of the light seal element 200 is uncovered. For example, the user can be provided with a view 50 of an external environment through at least a portion of the light seal element 200. The view 50 can be provided through an opening and/or an optional inner cover 250 extending across a portion of the light seal element 200. For example, the view 50 can be through sides of the light seal element 200 that are within a horizontal plane of the user's vision. Where the inner cover 250 is provided, it will be understood that the inner cover 250 can be partially or fully transparent and/or partially opaque. The cover 250 and/or an opening can further provide airflow for cooling and/or humidity control.

As further shown in FIG. 2, in the retracted configuration, the outer cover 260 can be at least partially retained within a portion of the chassis 202. For example, the outer cover 260 can form a coil 264 within a chamber, so that at least a portion of the outer cover 260 is hidden. The outer cover 260 can be biased to the retracted configuration. For example, where they outer cover 260 forms a coil 264, a spring (e.g., torsional spring) can apply a force that tends to retract the outer cover 260 to form the coil 264. At least a portion of the outer cover 260 can remain exposed for handling by a user.

FIG. 3 illustrates a top view of the head-mountable device 100 of FIG. 2 with the outer cover 260 in an extended configuration, according to some embodiments of the present disclosure. As shown in FIG. 3, the outer cover 260 can be transitioned to an extended configuration. In the extended configuration, the outer cover 260 can extend across a region that was previously uncovered. For example, the outer cover 260 can extend across the chassis 202 and/or between and/or to each of the outer side 212 and the inner side 214. Where an inner cover 250 is provided, the outer cover 260 can extend across at least a portion of the inner cover 250. The combined opacity through the inner cover 250 and the outer cover 260 can be lower than an opacity of only the inner cover 250.

As further shown in FIG. 3, the outer cover 260 can include a cover engagement element 262, for example at an end portion thereof. The chassis 202 and/or another portion of the light seal element 200 can include a light seal engagement element 292. One or more of various mechanisms can be provided to secure the outer cover 260 to the chassis 202. For example, mechanisms such as locks, latches, snaps, screws, clasps, threads, magnets, pins, an interference (e.g., friction) fit, knurl presses, bayoneting, and/or combinations thereof can be included to couple and/or secure the outer cover 260 to the chassis 202. The outer cover 260 can remain in the extended configuration until an optional release mechanism is actuated. The release mechanism can be provided on an outer surface of the light seal element 200 for access by a user.

As shown in FIG. 3, the covers 260 can be extended from the outer side 212 toward the inner side 214. This can require an applied force that is generally toward the face of the user. Accordingly, the user can stabilize the extension of the covers 260 while wearing the head-mountable device 100. It will be understood that other arrangements are contemplated, including extending from the inner side 214 toward the outer side 212, with a corresponding applied force in the direction of extension.

While two outer covers 260 are illustrated, it will be understood that any number of covers can be provided. For example, the light seal element 200 can include 1, 2, 3, 4, 5, 6, 7, 8, or more than 8 covers. The covers can be configured to extend across different regions of the chassis 202. The covers can, together, cover an entirety of the perimeter of the light seal element 200.

Figure 4:
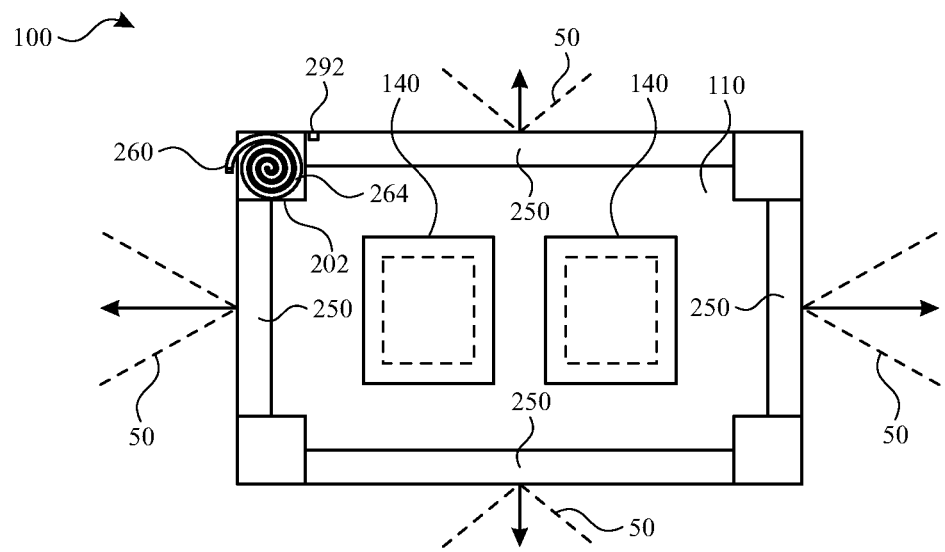
FIG. 4 illustrates a rear view of a head-mountable device with a cover of a light seal element in a retracted configuration, according to some embodiments of the present disclosure.
Figure 5:
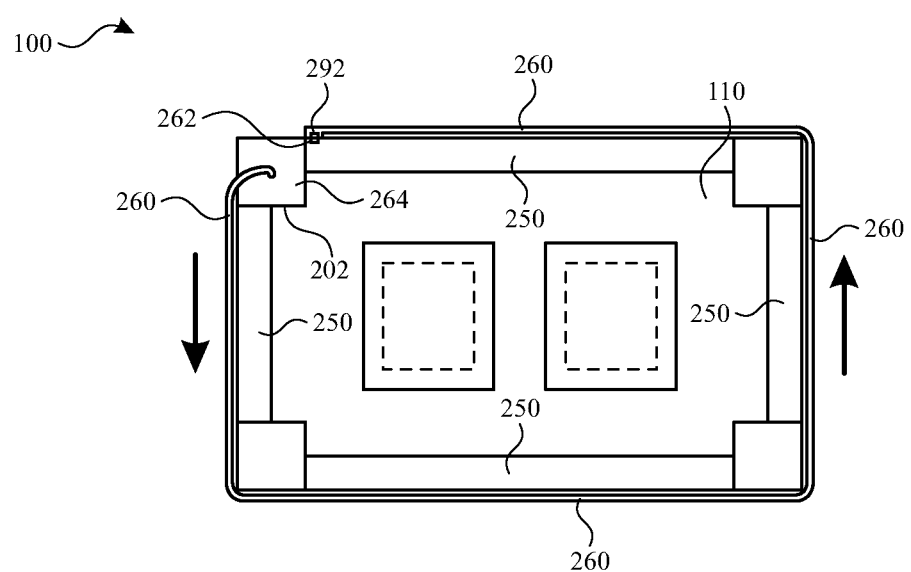
FIG. 5 illustrates a rear view of the head-mountable device of FIG. 4 with the cover in an extended configuration, according to some embodiments of the present disclosure.

Referring now to FIGS. 4 and 5, one or more covers of a light seal element can provide variable opacity as at least one of the covers transitions between retracted and extended configurations. For example, a cover can be adjusted to extend about a perimeter of the light seal element.

FIG. 4 illustrates a rear view of a head-mountable device 100 with an outer cover 260 of a light seal element 200 in a retracted configuration, according to some embodiments of the present disclosure. As shown in FIG. 4, an outer cover 260 can be stored in a retracted configuration. While in the retracted configuration, at least a portion of the light seal element 200 is uncovered. For example, the user can be provided with a view 50 of an external environment through at least a portion of the light seal element 200. The view 50 can be provided through an opening and/or an optional inner cover 250 extending across a portion of the light seal element 200. Where the inner cover 250 is provided, it will be understood that the inner cover 250 can be partially or fully transparent and/or partially opaque. The cover 250 and/or an opening can further provide airflow for cooling and/or humidity control.

As further shown in FIG. 4, in the retracted configuration, the outer cover 260 can be at least partially retained within a portion of the chassis 202. For example, the outer cover 260 can form a coil 264 within a chamber, so that at least a portion of the outer cover 260 is hidden. The outer cover 260 can be biased to the retracted configuration. For example, where they outer cover 260 forms a coil 264, a spring (e.g., torsional spring) can apply a force that tends to retract the outer cover 260 to form the coil 264. At least a portion of the outer cover 260 can remain exposed for handling by a user.

FIG. 5 illustrates a rear view of the head-mountable device 100 of FIG. 4 with the outer cover 260 in an extended configuration, according to some embodiments of the present disclosure. As shown in FIG. 5, the outer cover 260 can be transitioned to an extended configuration. In the extended configuration, the outer cover 260 can extend about a region that was previously uncovered. For example, the outer cover 260 can extend about the chassis 202. Where an inner cover 250 is provided, the outer cover 260 can extend across at least a portion of the inner cover 250. The combined opacity through the inner cover 250 and the outer cover 260 can be lower than an opacity of only the inner cover 250.

As further shown in FIG. 5, the outer cover 260 can include a cover engagement element 262, for example at an end portion thereof. The chassis 202 and/or another portion of the light seal element 200 can include a light seal engagement element 292. One or more of various mechanisms can be provided to secure the outer cover 260 to the chassis 202, as described above with respect to FIGS. 2 and 3.

While one outer cover 260 is illustrated, it will be understood that any number of covers can be provided. For example, the light seal element 200 can include 1, 2, 3, 4, 5, 6, 7, 8, or more than 8 covers. The covers can be configured to extend across different regions of the chassis 202. For example, a cover 260 can be provided for each of the upper, lower, left, and right sides of the light seal element. The covers can, together, cover an entirety of the perimeter of the light seal element 200.

Figure 6:
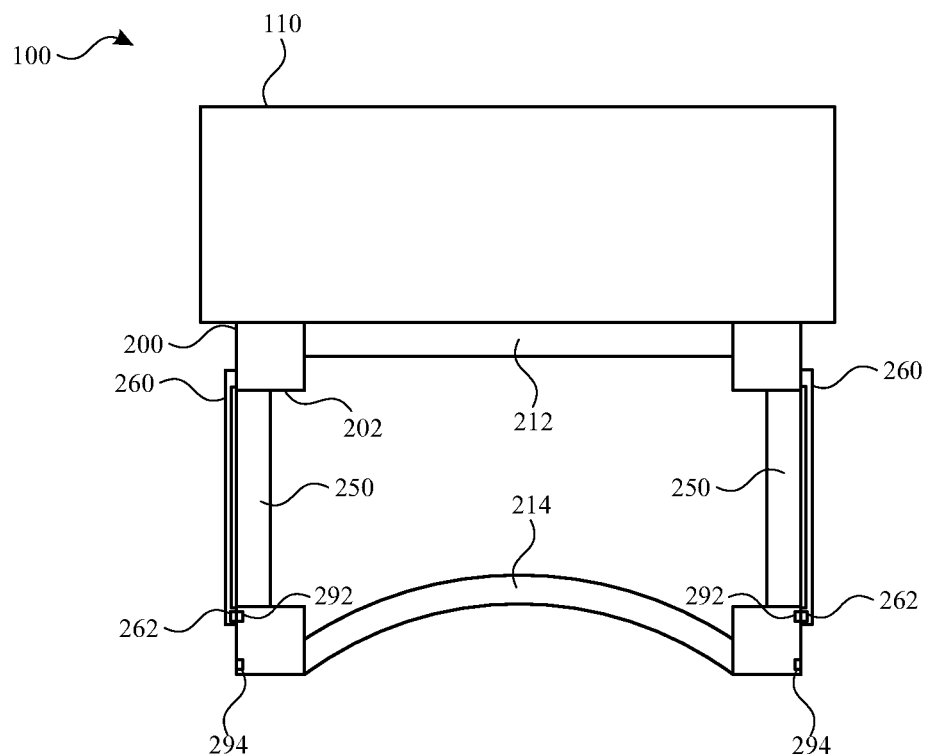
FIG. 6 illustrates a top view of a head-mountable device with a cover of a light seal element in a retracted configuration, according to some embodiments of the present disclosure.
Figure 7:
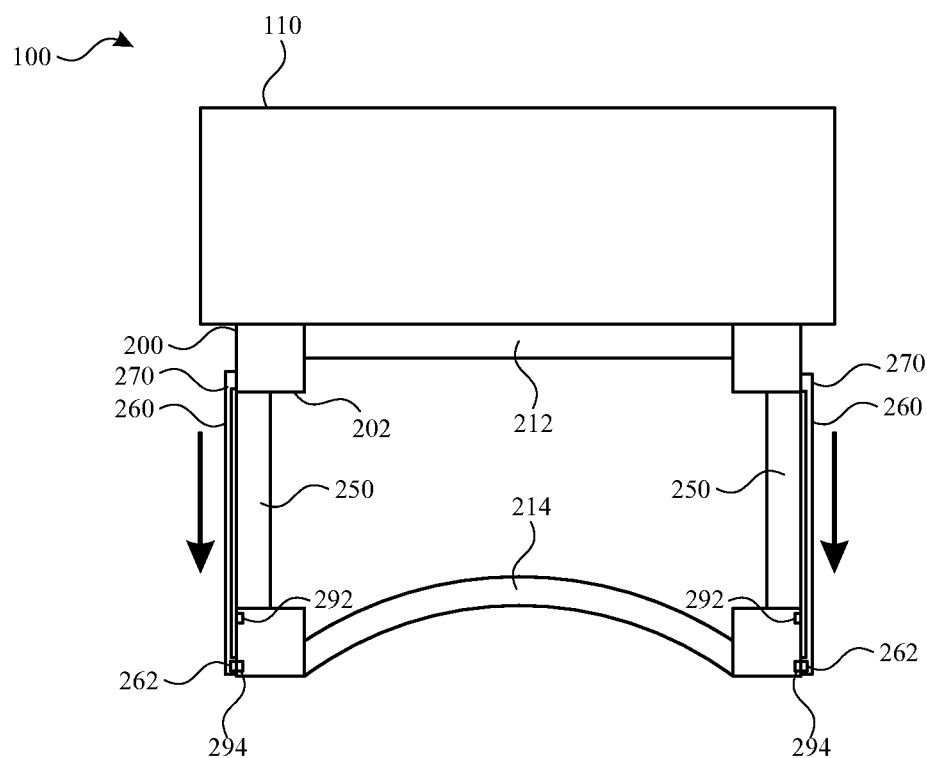
FIG. 7 illustrates a top view of the head-mountable device of FIG. 6 with the cover in an extended configuration, according to some embodiments of the present disclosure.

Referring now to FIGS. 6 and 7, one or more covers of a light seal element can provide variable opacity as at least one of the covers transitions between retracted and extended configurations. For example, a cover can be adjusted to extend across different lengths of the light seal element by moving and/or stretching.

FIG. 6 illustrates a top view of a head-mountable device 100 with an outer cover 260 of a light seal element 200 in a retracted configuration, according to some embodiments of the present disclosure. As shown in FIG. 6, a retracted configuration of the outer cover 260 can be one in which the outer cover 260 extends across a shorter length than it does in the extended configuration. While in the retracted configuration, the same portion of the light seal element 200 can be covered as is in the extended configuration. An optional inner cover 250 can be provided as extending across the same portion of the light seal element 200.

As further shown in FIG. 6, the outer cover 260 can extend from the same anchor position 270 in the retracted and extended configurations. The anchor position 270 can be at an end portion of the outer cover 260. Alternatively, both of the ends of the outer cover 260 can be moved to change the length of the outer cover 260. Alternatively, both of the ends of the outer cover 260 can be moved to without changing the length of the outer cover 260, for example by moving (e.g., translating, shifting, sliding) the outer cover 260. Where the optional inner cover 250 is provided, such translation can change an alignment of the outer cover 260 and the inner cover 250, as described further herein.

FIG. 7 illustrates a top view of the head-mountable device 100 of FIG. 6 with the outer cover 260 in an extended configuration, according to some embodiments of the present disclosure. As shown in FIG. 7, the outer cover 260 can be transitioned to an extended configuration. In the extended configuration, the outer cover 260 can extend across the same region that was previously covered, but spanning a yet greater region by increasing its length in at least one dimension. Accordingly, the outer cover 260 can provided elastic features to stretch across different lengths. The opacity of the outer cover 260 can be different (e.g., lower) in the extended configuration than in the retracted configuration, as described further herein.

As further shown in FIG. 7, the outer cover 260 can include a cover engagement element 262, for example at an end portion thereof. The chassis 202 and/or another portion of the light seal element 200 can include a first light seal engagement element 292 and a second light seal engagement element 294. The second light seal engagement element 294 can be a distance from the inner side 212 or the anchor position 270 that is greater than that of the first light seal engagement element 292. One or more of various mechanisms can be provided to secure the outer cover 260 to the chassis 202, as described above with respect to FIGS. 2 and 3.

As shown in FIG. 7, the covers 260 can be extended from the outer side 212 toward the inner side 214. This can require an applied force that is generally toward the face of the user. Accordingly, the user can stabilize the extension of the covers 260 while wearing the head-mountable device 100. It will be understood that other arrangements are contemplated, including extending from the inner side 214 toward the outer side 212, with a corresponding applied force in the direction of extension.

While two outer covers 260 are illustrated, it will be understood that any number of covers can be provided. For example, the light seal element 200 can include 1, 2, 3, 4, 5, 6, 7, 8, or more than 8 covers. The covers can be configured to extend across different regions of the chassis 202. The covers can, together, cover an entirety of the perimeter of the light seal element 200.

Figure 8:
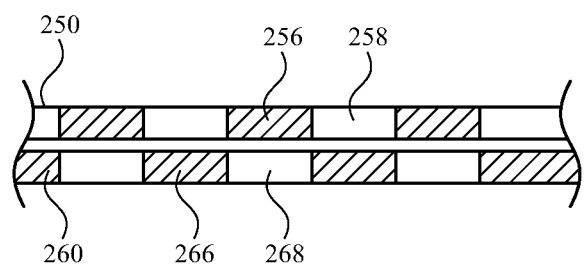
FIG. 8 illustrates a sectional view of overlapping covers of a light seal element in a staggered configuration, according to some embodiments of the present disclosure.
Figure 9:
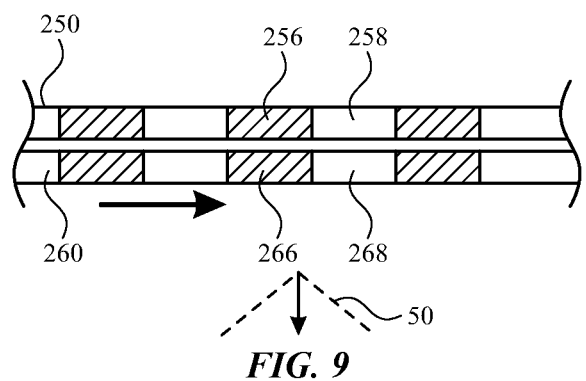
FIG. 9 illustrates a sectional view of the overlapping covers of FIG. 8 in an aligned configuration, according to some embodiments of the present disclosure.

Referring now to FIGS. 8 and 9, multiple overlapping covers can have different alignments to provide different opacities through the combination of layers. For example, the interstices of the covers can be aligned or staggered to control the opacity. Such configurations can be achieved by moving and/or stretching one or both of the covers.

FIG. 8 illustrates a sectional view of overlapping covers 250 and 260 of a light seal element in a staggered configuration, according to some embodiments of the present disclosure. As shown in FIG. 8, the inner cover 250 can form a mesh that includes portions of material 256 and interstices 258 there between. Likewise, the outer cover 260 can form a mesh that includes portions of material 266 and interstices 268 there between. The mesh can include a structure that is woven, molded, machined, monolithic, or combinations thereof.

While in a staggered configuration, the interstices 258 of the inner cover 250 and the interstices 268 of the outer cover 260 are not aligned (e.g., not overlapping each other). The portions of material of the inner cover 250 can block the interstices 268 of the outer cover 260, and the portions of material of outer cover 260 can block the interstices 258 of the inner cover 250. Accordingly, little or no light and/or airflow is provided through the combination of covers.

FIG. 9 illustrates a sectional view of the overlapping covers 250 and 260 of FIG. 8 in an aligned configuration, according to some embodiments of the present disclosure. As shown in FIG. 9, the outer cover 260 and the inner cover 250 can move relative to each other. For example, one or both of the outer cover 260 and the inner cover 250 can be moved to achieve a staggered configuration. The covers can optionally include coating or other features (e.g., low friction materials) to reduce friction as the covers move across each other. While in a staggered configuration, the interstices 258 of the inner cover 250 and the interstices 268 of the outer cover 260 are aligned (e.g., overlapping each other). The portions of material of the inner cover 250 can overlap the portions of material of outer cover 260, and the interstices 268 of the outer cover 260 can overlap the interstices 258 of the inner cover 250. Accordingly, the combination of covers can have a lower opacity, thereby allowing a greater amount of light and/or airflow there through. The combination of covers can optionally be only partially transparent and/or providing partial opacity while still allowing some light and airflow.

It will be understood that other types of relative movement can adjust an opacity of the combined covers. For example, each cover can have a polarization that transmits light of a particular polarity. In a first relative orientation, the covers can block all light by each filtering the other's programmed polarity. In a second relative orientation, the covers can permit some or all light by allowing some or all of each other's programmed polarity.

It will be understood that the transition between a staggered configuration and an aligned configuration can be achieved with any of the light seal elements 200 described herein, including those of FIGS. 2-7. In some embodiments, one or both of the covers 250 and 260 can move without stretching to align or stagger the interstices. Additionally or alternatively, one or both of the covers 250 and 260 can stretch to align or stagger the interstices.

Figure 10:
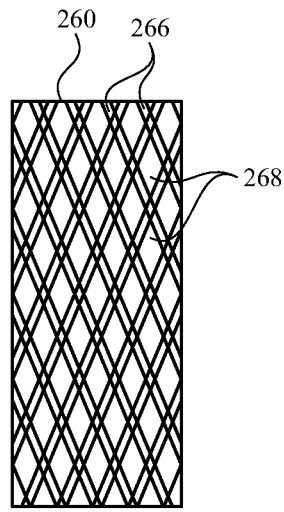
FIG. 10 illustrates a front view of a cover of a light seal element in a first configuration, according to some embodiments of the present disclosure.
Figure 11:
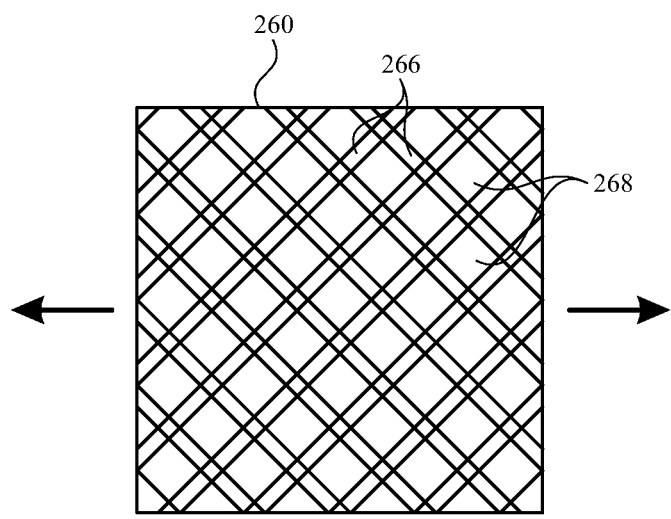
FIG. 11 illustrates a front view of the cover of FIG. 10 in a second configuration, according to some embodiments of the present disclosure.

Referring now to FIGS. 10 and 11, a cover can have different configurations to provide different opacities through the cover. For example, the interstices and/or density of material in a cover can be altered by controlling the length of the cover.

FIG. 10 illustrates a front view of an outer cover 260 of a light seal element in a first configuration, according to some embodiments of the present disclosure. As shown in FIG. 10, the outer cover 260 can form a mesh that includes portions of material 256 and interstices 258 there between. Likewise, the outer cover 260 can form a mesh that includes portions (e.g., threads, struts, etc.) of material 266 and interstices 268 there between. The mesh can include a structure that is woven, knit, molded, machined, stamped, monolithic, or combinations thereof.

While in a retracted configuration, the interstices 268 of the outer cover 260 are relatively small. Additionally or alternatively, while in the retracted configuration, the portions of material 266 have a density that is relatively high. Accordingly, little or no light and/or airflow is provided through the outer cover 260.

FIG. 11 illustrates a front view of the outer cover 260 of FIG. 10 in a second configuration, according to some embodiments of the present disclosure. As shown in FIG. 11, the outer cover 260 can stretch and/or otherwise be adjusted to change its length or other features. For example, the outer cover 260 can be stretched to a length that is greater than the length in the first configuration. While in the second configuration, the interstices 268 of the outer cover 260 are larger and/or have a different shape than when in the first configuration. The portions of material of the outer cover 260 can shift relative to each other to achieve the transitions. Accordingly, the outer cover 260 can have a lower opacity in the second configuration, thereby allowing a greater amount of light and/or airflow there through. It will be understood that the outer cover 260 can optionally be only partially transparent and/or providing partial opacity while still allowing some light and airflow.

It will be understood that the transition between a first configuration and a second configuration can be achieved with any of the light seal elements 200 described herein, including those of FIGS. 2-7. In some embodiments, the outer cover 260 can move one or both of its ends to stretch and/or contract. Additionally or alternatively, one or both of the covers 250 and 260 can stretch to alter its own opacity, which can in turn alter the combined opacity.

In some embodiments, the head-mountable devices described herein can alter their operation based on the configuration and/or status of one or more covers. For example, the head-mountable device can detect a condition by one or more sensors thereof. Such conditions can include the status of one or more covers as being in retracted, extended, and/or other configuration. Based on the detection, the head-mountable device can adjust one or more settings for the operation thereof. For example, the head-mountable device can adjust output features of the display elements based on whether and how much external light is permitted to enter the light seal element. By further example, the brightness, contrast, and/or other characteristics of the display elements can be adjusted to maintain a desired view of the display elements given the presence or absence of light from an external environment.

In some embodiments, the a sensor (e.g., environmental sensor, depth sensor, proximity sensor, etc.) of the head-mountable device can detect a condition of an external environment to prompt or effect transition of a configuration. Such a condition can include the presence of an object, device, or person in a vicinity of the user to determine whether a view of the object or person should be provided by moving peripheral portions of a light seal element. By further example, a sensor of the head-mountable device can detect a condition of a user and/or a space between the head-mountable device and the user. Such conditions can include temperature, humidity, and the like to determine whether air from an external environment should be allowed into the light seal element. Additionally or alternatively, the detection can be performed in response to an operational state of the head-mountable device (e.g., on/off state, application launch, user input command, and the like). The detection can further include the current configuration of a cover (e.g., retracted or extended). Such a detection can be direct or inferred (e.g., from an amount of ambient light detected within the light seal element). Based on the detection, the head-mountable device can operate a motor or actuator to actively transition one or more covers between configurations. Additionally or alternatively, the head-mountable device can provide a notification to the user to manually transition one or more covers.

Figure 12:
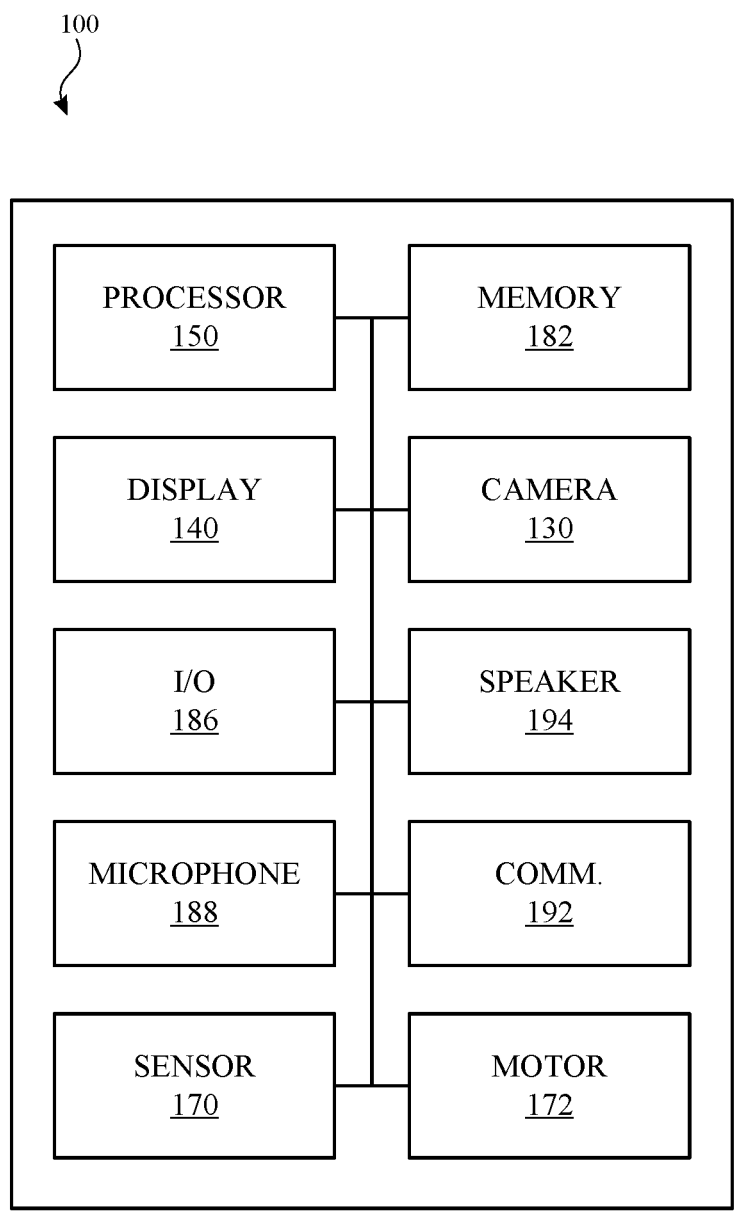
FIG. 12 illustrates a block diagram of a head-mountable device, in accordance with some embodiments of the present disclosure.

Referring now to FIG. 12, components of the head-mountable device can be operably connected to provide the performance described herein. FIG. 12 shows a simplified block diagram of an illustrative head-mountable device 100 in accordance with one embodiment of the invention. It will be appreciated that components described herein can be provided on one, some, or all of a frame, a light seal element, and/or a head securement element. It will be understood that additional components, different components, or fewer components than those illustrated may be utilized within the scope of the subject disclosure.

As shown in FIG. 12, the head-mountable device 100 can include a processor 150 (e.g., control circuitry) with one or more processing units that include or are configured to access a memory 182 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display element 140 for close up viewing. The optical subassembly can include one or more lenses, mirrors, or other optical devices.

The head-mountable device 100 can include adjustment control components described herein, such as a motor 172, an actuator, and the like for moving components to a desired relative position and/or orientation of a cover.

The head-mountable device 100 can include one or more sensors 170, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include one or more speakers 194. The speakers 194 can be operably connected to the processor 150 for control of audio output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery, which can charge and/or power components of the head-mountable device 100. The battery can also charge and/or power components connected to the head-mountable device 100.

Accordingly, embodiments of the present disclosure provide a head-mountable device that includes a light seal element with adjustable opacity. In various configurations of the light seal element, the opacity there through can be adjusted to control an amount of light and/or airflow from an external environment. For example a cover or combination of overlapping covers can be adjusted to selectively exclude light from an external environment or provide a direct view to the external environment. Transitions can be achieved while the head-mountable device is worn by a user.

Various examples of aspects of the disclosure are described below as clauses for convenience. These are provided as examples, and do not limit the subject technology.

Clause A: a head-mountable device comprising: a frame; a display element supported by the frame; and a light seal element comprising: an inner side coupled to the frame; an outer side for engaging a face of a user; and a cover configured to transition between: an extended configuration in which the cover extends from the inner side to the outer side; and a retracted configuration in which the cover does not extend from the inner side to the outer side.

Clause B: a head-mountable device comprising: a frame; a display element supported by the frame; and a light seal element comprising: an outer side coupled to the frame; an inner side for engaging a face of a user; and a first cover forming first interstices; and a second cover forming second interstices, wherein the first cover and the second cover are moveable relative to each other such that: in a first overlapping configuration, the first interstices and the second interstices align to form a first opacity; and in a second overlapping configuration, the first interstices and the second interstices are staggered to form a second opacity, different than the first opacity.

Clause C: a head-mountable device comprising: a frame; a display element supported by the frame; a light seal element comprising: a chassis; a cover extending from an anchor position on the chassis, the cover comprising a cover engagement element; a first chassis engagement element a first distance away from the anchor position, wherein, when the cover engagement element engages the first chassis engagement element, the cover has a first opacity; and a second chassis engagement element a second distance away from the anchor position, the second distance being greater than the first distance, wherein, when the cover engagement element engages the second chassis engagement element, the cover has a second opacity, different than the first opacity.

One or more of the above clauses can include one or more of the features described below. It is noted that any of the following clauses may be combined in any combination with each other, and placed into a respective independent clause, e.g., clause A, B, or C.

Clause 1: a camera configured to capture a view, wherein the display element is configured to display the view; a sensor; a microphone; and a speaker.

Clause 2: the cover is configured to retract within the outer side while in the retracted configuration.

Clause 3: the cover is configured to form a coil in the retracted configuration.

Clause 4: the cover is biased to the retracted configuration.

Clause 5: the cover comprises a cover engagement element; the light seal element further comprises a chassis engagement element configured to engage the cover engagement element while the cover is in the extended configuration.

Clause 6: a sensor configured to detect a state of the light seal element in either the extended configuration or the retracted configuration; and a processor configured to control a setting of the display element based on the state of the light seal element.

Clause 7: the frame comprises a frame attachment element on an inner side of the frame; and the light seal element further comprises a light seal attachment element on the outer side of the light seal element, the light seal attachment element being configured to engage the frame attachment element.

Clause 8: the first cover comprises a first mesh defining the first interstices between adjacent first elements of the first mesh; and the second cover comprises a second mesh defining the second interstices between adjacent second elements of the second mesh.

Clause 9: the second cover comprises a cover engagement element; the light seal element further comprises: a first chassis engagement element configured to engage the cover engagement element while the first cover and the second cover are in the first overlapping configuration; and a second chassis engagement element configured to engage the cover engagement element while the first cover and the second cover are in the second overlapping configuration.

Clause 10: the cover further comprises threads woven to define interstices between adjacent pairs of the threads.

Clause 11: the cover is configured to alter its length and a size of the interstices.

Clause 12: the first opacity is based on a first density of a material of the cover along a portion of the chassis; and the second opacity is based on a second density of the material of the cover along the portion of the chassis.

Clause 13: the cover is a first cover; and the light seal element further comprises a second cover overlapping the first cover.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
a frame;
a display element supported by the frame; and a head securement element configured to secure the frame to a head;
a light seal element comprising: an inner side coupled to the frame;
an outer side for engaging a face of a user and comprising a light seal engagement element; and
a cover comprising a cover engagement element and being configured to transition between: an
extended configuration in which the cover extends from the inner side to the outer side with the cover engagement element being secured to the light seal engagement element at the outer side; and
a retracted configuration in which the cover does not extend from the inner side to the outer side.

2. The head-mountable device of claim 1, further comprising: a camera configured to capture a view, wherein the display element is configured to display the view; a sensor; a microphone; and a speaker.

3. The head-mountable device of claim 1, wherein the cover is configured to retract within the outer side while in the retracted configuration.

4. The head-mountable device of claim 1, wherein the cover is configured to form a coil in the retracted configuration.

5. The head-mountable device of claim 1, wherein the cover is biased to the retracted configuration.

6. The head-mountable device of claim 1, further comprising: a sensor configured to detect a state of the light seal element in either the extended configuration or the retracted configuration; and a processor configured to control a setting of the display element based on the state of the light seal element.

7. The head-mountable device of claim 1, wherein: the frame comprises a frame attachment element on an inner side of the frame; and the light seal element further comprises a light seal attachment element on the outer side of the light seal element, the light seal attachment element being configured to engage the frame attachment element.

8. A head-mountable device comprising:
a frame;
a display element supported by the frame; and
a light seal element comprising: an outer side coupled to the frame;
an inner side for engaging a face of a user; and
a first cover forming first interstices; and
a second cover forming second interstices, wherein the first cover and the second cover are moveable relative to each other such that:
in a first overlapping configuration, the first interstices and the second interstices align to form a first opacity; and
in a second overlapping configuration, the first interstices and the second interstices are staggered to form a second opacity, different than the first opacity.

9. The head-mountable device of claim 8, wherein: the first cover comprises a first mesh defining the first interstices between adjacent first elements of the first mesh; and the second cover comprises a second mesh defining the second interstices between adjacent second elements of the second mesh.

10. The head-mountable device of claim 8, wherein: the second cover comprises a cover engagement element; the light seal element further comprises: a first light seal engagement element configured to engage the cover engagement element while the first cover and the second cover are in the first overlapping configuration; and
a second light seal engagement element configured to engage the cover engagement element while the first cover and the second cover are in the second overlapping configuration.

11. The head-mountable device of claim 8, further comprising: a sensor configured to detect a state of the light seal element in either the first overlapping configuration or the second overlapping configuration; and a processor configured to control a setting of the display element based on the state of the light seal element.

12. The head-mountable device of claim 8, wherein: the frame comprises a frame attachment element on an inner side of the frame; and the light seal element further comprises a light seal attachment element on the outer side of the light seal element, the light seal attachment element being configured to engage the frame attachment element.

13. A head-mountable device comprising:
a frame;
a display element supported by the frame;

a head securement element configured to secure the frame to a head;

a light seal element comprising:

an inner side coupled to the frame and comprising an anchor position;

an outer side for engaging a face of a user; and a cover extending from the anchor position, the cover comprising a cover engagement element;

a first light seal engagement element positioned at the outer side and a first distance away from the anchor position, wherein, when the cover engagement element engages the first light seal engagement element, the cover has a first opacity; and a second light seal engagement element positioned at the outer side and a second distance away from the anchor position, the second distance being greater than the first distance, wherein, when the cover engagement element engages the second light seal engagement element, the cover has a second opacity, different than the first opacity.

14. The head-mountable device of claim 13, wherein the cover further comprises threads woven to define interstices between adjacent pairs of the threads.

15. The head-mountable device of claim 14, wherein the cover is configured to alter its length and a size of the interstices.

16. The head-mountable device of claim 13, wherein: the first opacity is based on a first density of a material of the cover along a portion of the light seal element; and the second opacity is based on a second density of the material of the cover along the portion of the light seal element.

17. The head-mountable device of claim 13, wherein: the cover is a first cover; and the light seal element further comprises a second cover overlapping the first cover.

18. The head-mountable device of claim 13, further comprising: a sensor configured to detect a state of the light seal element with the cover engagement element engaging either the first light seal engagement element or the second light seal engagement element; and a processor configured to control a setting of the display element based on the state of the light seal element.

19. The head-mountable device of claim 13, wherein: the frame comprises a frame attachment element on an inner side of the frame; and the light seal element further comprises a light seal attachment element on the outer side of the light seal element, the light seal attachment element being configured to engage the frame attachment element.

* * * * *